No. 747,736. PATENTED DEC. 22, 1903.
R. H. LEWIS.
TIRE TIGHTENER.
APPLICATION FILED MAY 11, 1903.
NO MODEL.
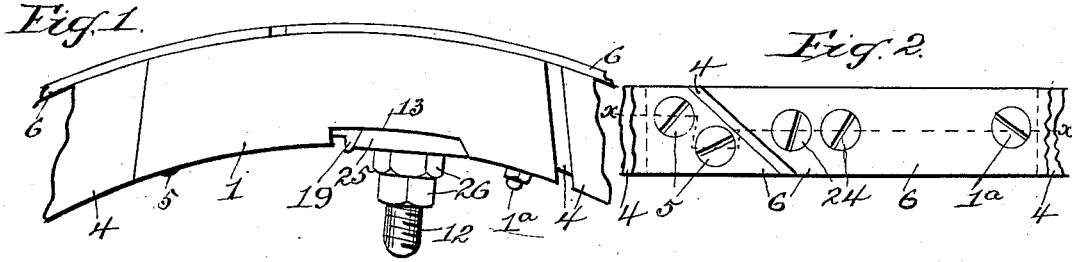
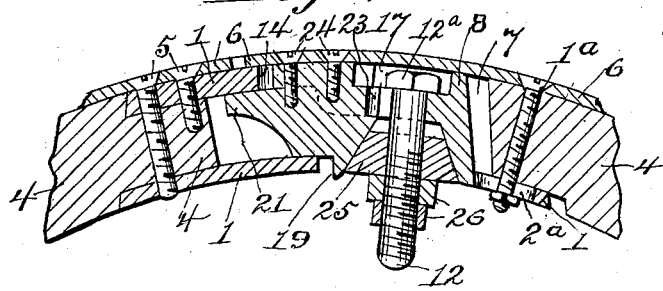
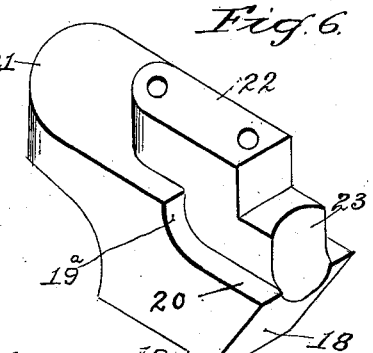
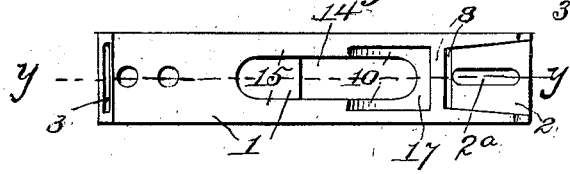
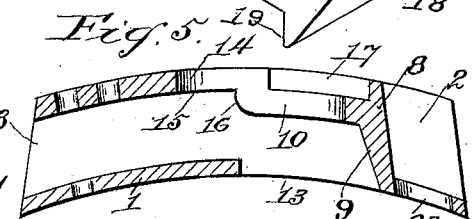
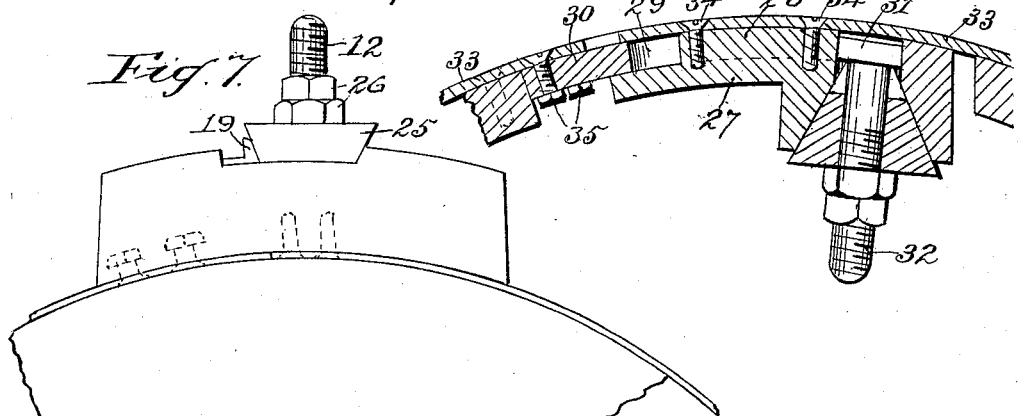
Witnesses
V. H. Whitman
M. J. Madigan
Inventor
Richard Henry Lewis
By C. H. V. Belt
Attorney
THE NORRIS PETERS CO., PHOTO-LITHO., WASHINGTON, D. C.

No. 747,736. Patented December 22, 1903.

UNITED STATES PATENT OFFICE.

RICHARD HENRY LEWIS, OF RIVERDALE, MARYLAND.

TIRE-TIGHTENER.

SPECIFICATION forming part of Letters Patent No. 747,736, dated December 22, 1903.

Application filed May 11, 1903. Serial No. 156,618. (No model.)

*To all whom it may concern:*

Be it known that I, RICHARD HENRY LEWIS, a citizen of the United States, residing at Riverdale, in the county of Prince George and State of Maryland, have invented certain new and useful Improvements in Tire-Tighteners, of which the following is a specification.

This invention relates to means for tightening bands, hoops, and similar articles and pertains especially to a vehicle-tire tightener.

The object of the invention is to provide a device of such novel and peculiar character that it may be employed upon a vehicle-wheel to tighten the tire, or it may be attached to a hoop, band, and the like to connect and tighten the same.

A further object of the invention is to provide a wheel-felly holder adapted to be set in an opening or space made by removing a portion of a wheel-felly without removing or disturbing the tire, the ends of the felly at said space being held by the holder, one of said ends being fixed to the holder and the other end attached to the holder to slide therein and to furnish the holder with means for tightening the tire.

A still further object of the invention is to provide a felly-holder adapted to have a tire attached thereto and a slidable block carried in or by the holder and having the tire attached thereto, said block being operated by a wedge-follower to tighten and hold the tire after the latter is cut between its two said points of attachment.

Various other objects, advantages, and improved results in tire-tightening and band and hoop connections and tightening are produced by my device, as will be seen from the specification and claims to follow.

In the accompanying drawings, forming part of this application, Figure 1 is a side elevation showing a tire tightened and held by the device with provision for further tightening of the tire, the latter and the felly being partly broken away. Fig. 2 is a top edge view. Fig. 3 is a section on the line $xx$, Fig. 2. Fig. 4 is a top view of the holder with its carried parts removed. Fig. 5 is a section on the line $yy$, Fig. 4. Fig. 6 is a detail perspective view of the slidable block. Fig. 7 is an elevation showing the holder applied to a hoop or band. Fig. 8 is a sectional view of a modification, partly broken away.

The same numeral-references denote the same parts throughout the several views of the drawings.

The invention is capable of operation in connection with various articles; but more especially is it applicable to vehicle-tires, and for this reason it will be particularly shown and described applied to a tire, it being understood that it is equally as applicable to old as to new tires and may form a part of the latter in their manufacture and sale; but for purposes of illustration a worn or loose tire is herein employed.

The holder 1 is preferably in the shape of a segment of a wheel-felly and has end sockets 2 and 3, into which the ends of a felly 4, formed by removing a section of the felly, are fitted. The socket 3 has screws 5 for attaching a tire 6 and this end of the felly to the holder. The other felly end is not attached to the holder, but is simply fitted into the socket 2 and slidably held there and to the tire by a screw $1^a$ and slot $2^a$, so as to leave a take-up space 7. The socket 2 has a wall 8, provided with a beveled or inclined face 9, which terminates in flanges 10, so that the top of the latter forms a seat for the head of a bolt 12, which extends through an opening 13 in the holder. An elongation 14 and flanges 15 form shoulders 16, with the flanges 10, so that a cavity 17 is formed for the bolt-head $12^a$.

The slidable wedge-block is inserted into the holder through the opening 13 and comprises a beveled or inclined face 18 to match the holder-face 9 and terminates in a stop 19 to engage the edge of the opening 13 and limit the movement of the block from the bolt 12. Shoulders $19^a$ engage the shoulders 16 to stop the movement of the block toward the bolt 12. Extending in one direction from the shoulders $19^a$ are bearings 20, which rest against the under side of the flanges 10, and extending in the other direction from the shoulders $19^a$ is a tail or wing 21, bearing on the flanges 15 and on the wall of the holder, so as to cover the elongation 14 in whatever position the block may be. A lug 22 extends through the elongation, and a groove 23 is formed in the end of the block for the bolt 12. The other end of the tire is secured to the lug 22 by screws 24. A follower-wedge 25 is loosely mounted to slide on the bolt 12, which is provided with suitable lock-nuts 26.

Fig. 7 shows the device applied to a barrel or tank band or hoop. The only difference is that the holder opening and elongation are changed or reversed, the operating mechanism being the same as that just described.

Referring to the modification shown in Fig. 8, the parts are plate-like. The wedge-block 27 has a lug 28 extending through a slot 29 in the wedge-plate 30, and a portion of the walls of said slot is beveled or shouldered to hold the rectangular head 31 of a bolt 32, one end of the tire 33 being secured to the lug 28 by screws 34 and the other end to the wedge-plate 30 by screws 35.

Preparatory to applying the device a section of a wheel-felly a little more than the length of the holder is sawed out and removed. In the place of the removed section the holder is placed and secured by the screws 5, the tire slitted or cut or a portion thereof removed, as occasion may require, and the wedge-block secured to the tire. The lock-nuts are then operated to force the wedge-follower, according as the tire may require, until the latter is firm and tight. The device is left in this position for future use, so that the tire may be tightened from time to time without other work except operating the lock-nuts.

It is obvious that in the total disability of a tire or wheel the device may be transferred or preserved for future use.

It will be seen that the working or movable parts of the device are thoroughly shielded and protected from dust, sand, mud, and water, that the lock-nuts have simply to be moved to operate the device for adjusting or tightening a tire, band, or hoop, that such adjustment may be effected while a vehicle is in use and without removing the wheel or tire, and that the device may be applied to a U-shaped felly, flat felly, or one of any other shape.

The application of the device to tank hoops or bands will be found a most convenient, certain, and expeditious means of connection and tightening.

Having thus described my invention, what I claim as new, and desire to secure by Letters Patent, is—

1. A device for tightening tires, bands and the like, comprising a holder or plate having an inclined or beveled face and secured to one end of the tire, a wedge-block projecting through the holder and secured to the other end of the tire, a bolt held by the holder, and a follower-wedge on the bolt and operated by suitable nuts.

2. A tire-tightener comprising a felly-holder adapted to form a section of the felly and having a beveled or wedge face and attached to one end of the tire and to the felly, a slidable block carried by the holder and having a lug projecting through one edge of the holder and secured to the other end of the tire, a bolt carried by the holder, and a follower-wedge on the bolt and operated through the other edge of the holder by suitable nuts to slide the block.

3. A tire-tightener comprising a holder adapted to replace a removed portion of a felly and having one end of a tire secured thereto, a face slanting from one edge of the holder inwardly, an elongation in the other edge of the holder, a slidable block having a lug to which the other end of the tire is secured, and working in the elongation, a bolt carried by the holder and extending therethrough, and a follower-wedge on the bolt and operated against the said faces by suitable nuts.

4. In a tire-tightener the combination, with the holder having a cavity and an elongation in one edge, an opening in the other edge the wall end of which opening is beveled or inclined, of the slidable block having a like beveled or inclined end working in said opening and terminating in a stop to engage the other end of the opening, a lug on the block extending through the other edge of the holder and working in the elongation, a bolt held in said cavity and extending through said opening, and a follower-wedge carried by the bolt and operated by suitable nuts.

5. In a wheel-tire tightener the combination, with the holder having one end of the tire secured thereto and provided with wheel-felly sockets, flanges on the interior of the holder and forming shoulders, a cavity and elongation in communication upon one edge of the holder, and an inclined face forming one end of an opening in the other edge of the holder, of the slidable block having a like face at one end and terminating in a stop working in the opening, a tail or wing at the other end of the block to cover the elongation, side bearings on the block which form shoulders that engage the holder-shoulders, a bolt depending from the cavity, and a follower-wedge loose on the bolt and operated by suitable nuts.

In witness whereof I hereunto set my hand in the presence of two witnesses.

RICHARD HENRY LEWIS.

Witnesses:
C. T. BELT,
FRANK S. APPLEMAN.